United States Patent Office 2,789,988
Patented Apr. 23, 1957

2,789,988
PREPARATION OF PHTHALIC ANHYDRIDE

David Brown, New York, and Alfred Saffer, Bayside, N. Y., assignors, by mesne assignments, to Mid-Century Corporation, Chicago, Ill., a corporation of Delaware No Drawing. Application October 25, 1954, Serial No. 464,648

8 Claims. (Cl. 260—346.7)

This invention relates to processes for the preparation of phthalic anhydride from phthalic acid wherein bound water in the acid is removed by heat treatment and distillation, particularly to such a process carried out in the presence of a lower aliphatic monocarboxylic acid having about 2 to 8 carbon atoms in the molecule, such as acetic acid, which is readily separable from the phthalic anhydride by distillation.

Phthalic anhydride has achieved considerable commercial success. It may be prepared by the vapor phase catalytic oxidation of naphthalene or orthoxylene. In some cases, the crude obtained thereby may be purified by distillation; however, where such impurities as phthalids are present, purification is especially difficult. Phthalic acid may also be prepared by the liquid phase nitric acid oxidation of lower dialkyl benzenes containing an appreciable amount of the ortho isomer, separation or concentration of the phthalic acids, followed by converting the phthalic acid to phthalic anhydride. In some cases, the mixture of phthalic acids may be such that, upon heating and dehydrating the phthalic acid a resulting liquid mixture is obtained, from which the phthalic anhydride may be recovered by filtration or selective extraction with a solvent such as acetone.

It has been found by tests that in the heat and distillation treatment of phthalic acid to prepare phthalic anhydride, a troublesome blocking of the column may occur approximately at the temperature region where phthalic anhydride solidifies but water remains in the vapor state. This tends to give poorer quality product, lower yields, and may be particularly hazardous from the operational viewpoint.

The discoveries associated with the invention and relating to the solution of the above problems and the objects achieved in accordance with the invention include the following: the provision of a process for preparing phthalic anhydride from phthalic acid by heat and distillation treatment to remove bound water from the acid wherein the process is carried out in the presence of an aliphatic carboxylic acid having about 2 to 4 carbon atoms in the molecule and substantially inert to chemical change in the system; the provision of such a process wherein a crude phthalic acid product in the form of a filter cake wet with acetic acid is so processed, the phthalic anhydride being removed as still residue; and other objects which will be apparent as details or embodiments of the invention are set forth hereinafter.

In order to facilitate the clear understanding of the invention, the following specific embodiments are described in detail:

Example 1

A crude phthalic acid mixture which may be obtained by the oxidation of a commercial orthoxylene (88% ortho, 4.7% meta, 1.5% para, and about 6% of other materials) by oxidation with nitric acid by known methods, or alternatively by catalytic liquid phase air oxidation, using about 75 parts by weight of the xylene, 125 parts of glacial acetic acid and about 1-2 parts by weight of manganese bromide catalyst, at a temperature of about 180 to 190° C., a pressure of about 400 p. s. i. g. (pounds per square inch gage), with air being passed therethrough at a rate of about 2 liters per hours, per gram of reactor charge with agitation. The solid phthalic acid product may be washed with glacial acetic acid, giving a filter cake wet with the acetic acid.

This material is heated in a pot with a distillation column with refluxing of acetic acid, at atmospheric pressure, dehydration begins at a pot temperature of about 120° C. and continues until a pot temperature of 290° C. is reached (dehydration completed). The overhead is distilled, water vapor being removed and acetic acid refluxed. Heating is continued until all the bound water is removed, which may be determined by sampling the stillpot contents or observing the absence of water in the overhead. The stillpot contents are removed, filtered hot to separate the molten phthalic anhydride from the solid isophthalic and terephthalic acids therein, and then the crude phthalic anhydride is purified by distillation at a vapor temperature in the range of 160 to 170° C., and pressure of about 25 mm. Hg.

In this way, about 95% of the phthalic acid content of the crude oxidation reaction mixture is recovered as phthalic anhydride of commercial purity.

The presence of the acetic acid facilitates removal of the bound water in phthalic acid at convenient temperature and pressure conditions, or alternatively at a fixed rate for a given set of temperature and pressure conditions. A major advantage resulting from the presence of acetic acid in sufficient amount, is that no solids accumulated in the fractionation column. Thus, water may be removed rapidly and with ease while vaporized phthalic anhydride is condensed and returned to the pot.

Carrying out such a process under substantially similar conditions but without the acetic acid, results in a slower dehydration and may give a deposit of solids in the temperature zone where water is still in the vapor state but phthalic anhydride condenses as a solid seriously interrupting the flow of materials and constituting an operational hazard.

Example 2

The procedure of Example 1 is followed except that the aliphatic acid is isovaleric acid. Similar yields are obtained. However, there is one additional operational advantage, since valeric acid may be condensed together with water in the overhead, the liquid acid forming as separate phase in contact with the liquid water. This valeric acid phase is separated and recycled to the fractionating column.

Comparable results to the foregoing are achieved with various modifications thereof such as the following. The lower aliphatic monocarboxylic acid may be acetic, propionic normal iso or secondary butyric, pentanoic, hexanoic, heptanoic or octanoic acids, stable in the system; and mixtures thereof may be used. The mixture treated may contain from about 10 to 100% phthalic acid. The crude phthalic anhydride may be removed as bottoms from the dehydration column, and the crude phthalic anhydride separated therefrom; e. g., by filtration to separate solid impurities, or selective solvent extraction to recover the phthalic anhydride; suitable solvents for this purpose are typified by acetone, methyl ethyl ketone and benzene, etc. The fractionation column is constructed of corrosion resistant material such as stainless steel. The heating and distillation may be carried out at a temperature in the range of 120 to 300° C. at the bottom, preferably 120 to 180° C. The temperature at the top is in the range of 40 to 120° C., preferably 90 to 118° C.; and the pressure thereat is 50 to 800 mm. Hg, preferably 500 to 760 mm. Hg. The proportion of lower aliphatic to phthalic acid may be in the range of 0.1 to 2.0 mols of the aliphatic acid per mol of the phthalic acid, preferably 0.5 to 1.5 mols.

In view of the foregoing disclosures, variations and modifications thereof will be apparent to one skilled in the art and it is intended to include within the invention all such variations and modifications except as do not come within the scope of the appended claims.

We claim:

1. In a process for the preparation of phthalic anhydride by the heat treatment of phthalic acid to remove bound water therefrom, the improvement which comprises carrying out the heat treatment in the presence of a saturated aliphatic carboxylic acid having 2 to 8 carbon atoms in the molecule in an amount within the range of 0.1 to 2.0 mols of said aliphatic acid per mol of the phthalic acid.

2. A process of claim 1 wherein the aliphatic acid is acetic.

3. A process of claim 1 wherein the aliphatic acid is propionic.

4. A process of claim 1 wherein the aliphatic acid is normal butyric.

5. A process of claim 1 wherein the aliphatic acid is isovaleric.

6. A process of claim 1 wherein the aliphatic acid is caproic.

7. A process of claim 1 carried out at a temperature in the range of 120 to 300° C. and a pressure in the range of 50 to 800 mm. Hg.

8. In a process for the preparation of phthalic anhydride by the heat treatment of phthalic acid to remove bound water therefrom, the improvement which comprises carrying out the heat treatment in the presence of a saturated aliphatic carboxylic acid having 2 to 8 carbon atoms in the molecule in an amount within the range of 0.5 to 1.5 mols of said aliphatic acid per mol of the phthalic acid.

References Cited in the file of this patent
UNITED STATES PATENTS 2,411,567     Fisher _____ Nov. 26, 1946

OTHER REFERENCES

Autenreith et al.: Berichte, vol. 57, pp. 423–437 (1924).

Ono et al.: Chem. Abst., vol. 32, p. 4143 (1938).

Organic Syntheses, Collective Vol. II, pp. 560–562, John Wiley and Sons, N. Y., 1943.

Organic Syntheses, vol. 29, p. 49 (1949), John Wiley and Sons, N. Y. (1949).